Dec. 9, 1958   J. F. DI STEFANO   2,863,395
TWO STAGE AIR TURBINE DRIVEN FUEL PUMP
Filed Aug. 25, 1953   2 Sheets-Sheet 1
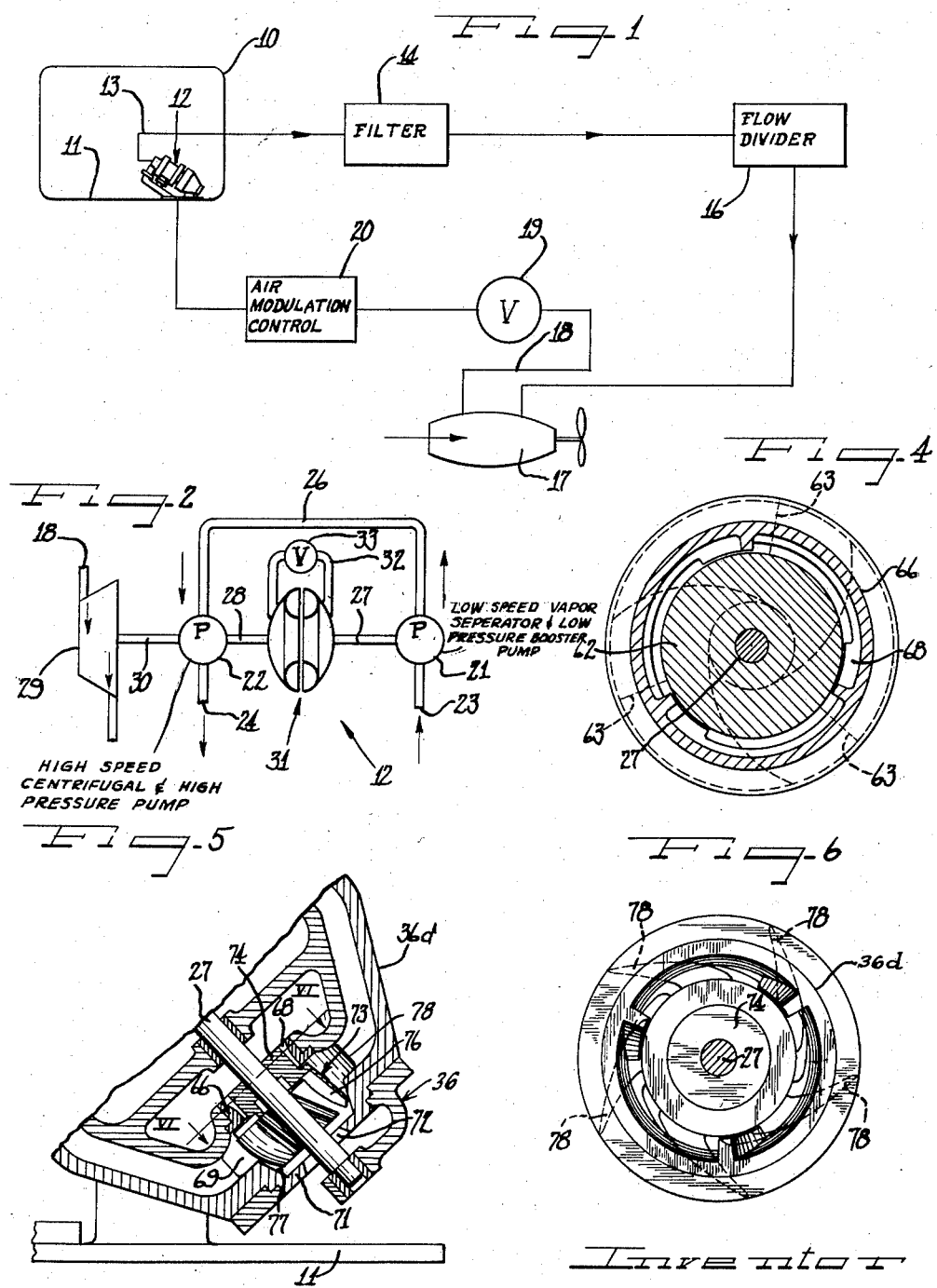
Inventor
John F. Di Stefano

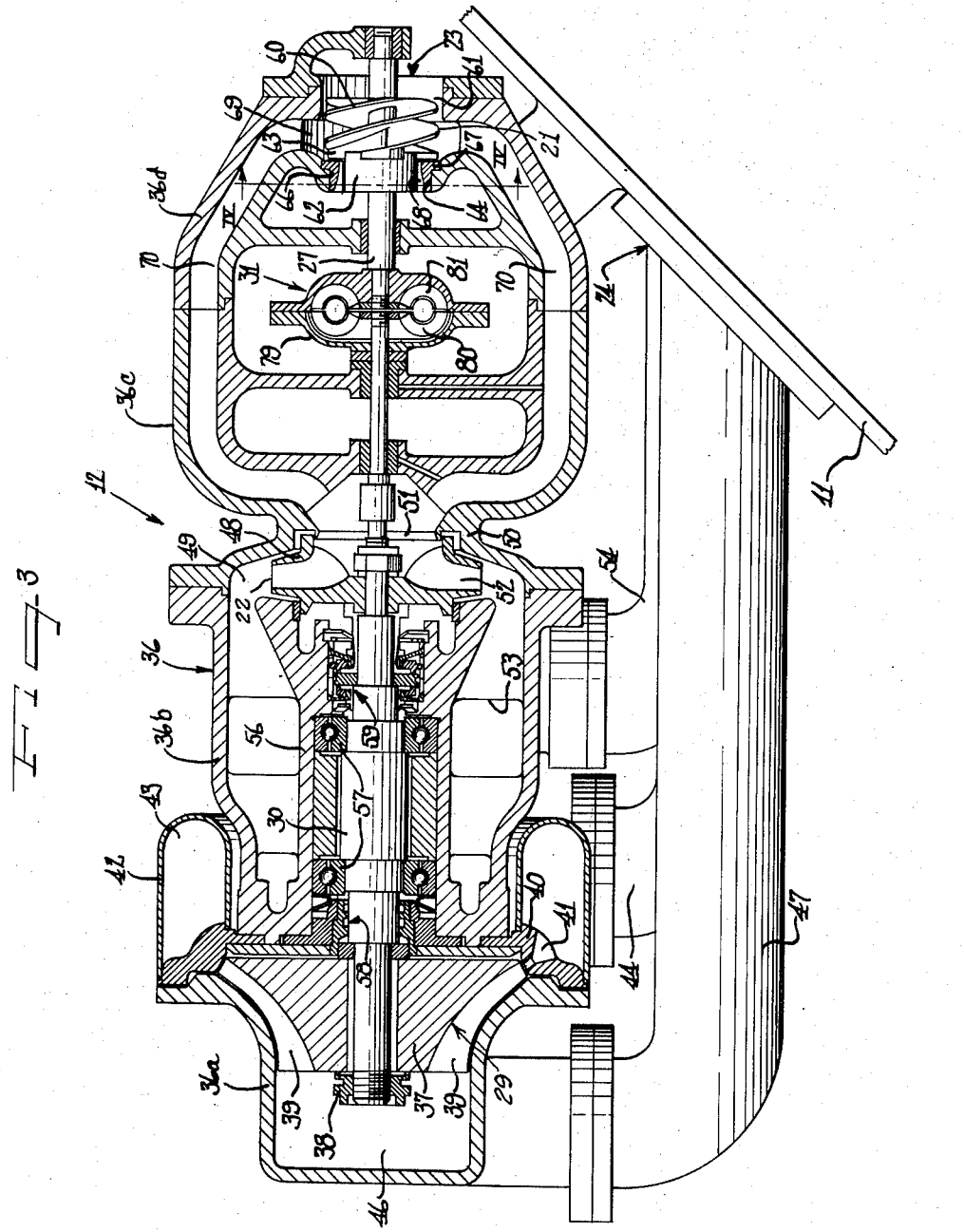

United States Patent Office 2,863,395
Patented Dec. 9, 1958

2,863,395

TWO STAGE AIR TURBINE DRIVEN FUEL PUMP

John F. Di Stefano, Lyndhurst, Ohio, assignor to Thompson Products, Inc., Cleveland, Ohio, a corporation of Ohio Application August 25, 1953, Serial No. 376,499

3 Claims. (Cl. 103—87)

This invention relates generally to fuel pump constructions and more particularly to an aircraft turbo-pump comprising a low speed vapor separator and low pressure booster pump and a high speed centrifugal and high pressure pump in series therewith with a fluid coupling interconnecting the pump and operating as a speed proportioner, an air driven turbine wheel forming a common driving engine for both of the pumps, thereby to combine the low speed booster pump operation with the high speed centrifugal pump.

In one form of a fuel system for a jet powered aircraft, the fuel pump is driven by high pressure air from the engine compressor. To obtain this type of power drive, an air driven turbine is preferably employed. The speed characteristics of such a turbine are directly related to the hydraulic horsepower to be delivered by the pump and are also related to the air horsepower which is actually delivered to the turbine wheel.

In an aircraft installation, it will be appreciated that a wide range of turbine speeds results in a structural arrangement wherein the turbine is utilized to drive a two stage fuel pump since the fuel pump requirements of the jet powered aircraft will vary considerably in response to altitude changes of the aircraft.

In accordance with the principles of the present invention, a two stage fuel pump is provided wherein the first stage comprises a low speed vapor separator low pressure impeller and the second stage comprises a high speed centrifugal high pressure impeller, the two impellers being staged in series relationship so as to obtain optimum altitude performance. In other words, the two different types of impellers are provided to meet the specific requirements of each particular stage since the first stage incorporates vapor separation characteristics and the second stage incorporates high pumping efficiency.

By directly connecting the air driven turbine to the high speed centrifugal impeller, a normal speed range for the high speed centrifugal impeller will be afforded.

In accordance with the principles of the present invention, the two impellers are interconnected by speed proportioning control means taking the form of a hydrodynamic speed reducer, for example, a fluid coupling or a torque-converter type of fluid coupling. With such an arrangement, a constant speed ratio is maintained between the high speed impeller and the low speed impeller irrespective of the turbine load imposed upon the air driven turbine.

It is an object of the present invention, therefore, to provide an aircraft fuel pump which will afford optimum altitude performance.

Another object of the present invention is to provide in a single package unit a two stage turbine driven pump having improved vapor separation characteristics and also having efficient high speed pumping capacity.

Yet another object of the present invention is to provide a two-stage fuel pump which advantageously combines high speed and low speed impellers interconnected by a speed-proportioning control means maintaining a constant speed ratio between the two impellers.

Many other features, advantages and additional objects of the present invention will become manifest to those skilled in the art upon making reference to the detailed description which follows, and the accompanying sheets of drawings, in which a preferred structural embodiment incorporating the principles of the present invention is shown by way of illustrative example.

On the drawings:

Figure 1 is a somewhat diagrammatic view of a fuel system for a jet-powered aircraft;

Figure 2 is a diagrammatic view of a two-stage turbo pump provided in accordance with the principles of the present invention;

Figure 3 is a sectional view, with parts shown in elevation and with parts removed, showing a preferred structural embodiment of a two-stage turbine driven aircraft fuel pump incorporating the principles of the present invention and utilized in the fuel system of Figure 1;

Figure 4 is a partial cross-sectional view taken substantially on line IV—IV of Figure 3;

Figure 5 is a fragmentary cross-sectional view with parts shown in elevation somewhat similar to the view of Figure 3 but showing an alternative form of low speed vapor-separating type low pressure impeller; and Figure 6 is a plan view taken substantially on line VI—VI of Figure 5 with the diffusion ring removed to show additional details of the impeller construction.

As shown on the drawings:

Although the principles of the present invention are of general utility, it will be appreciated that the present disclosure finds a particularly useful application in connection with an aircraft fuel system. Accordingly, in the fuel system of Figure 1 a fuel cell is indicated at 10 which is adapted to carry a supply of liquid fuel and on the bottom wall 11 of the cell is mounted a fuel pump 12 provided in accordance with the principles of the present invention.

A discharge conduit 13 receives the fluid pressurized by the fuel pump 12 and carries the fuel through a filter indicated at 14, a fuel flow divider indicated at 16 and through an aircraft jet engine indicated at 17.

In accordance with usual practice, the jet engine 17 is provided with an engine compressor discharging compressed air through a conduit 18 regulated by a control valve 19, through an air modulation control indicated at 20 and to the fuel pump 12 in the fuel cell 10.

In the diagrammatic view of Figure 2, the principal components of the fuel pump 12 are shown in schematic form. The fuel pump 12 comprises a low speed, vapor separator and low pressure booster pump 21 and further includes a high speed centrifugal and high pressure pump 22. A pump inlet 23 is provided for the pump 21 and a pump outlet 24 is provided for the high speed pump 22. Fluid connection 26 is provided between the pumps 21 and 22 so as to stage the low pressure pump 21 and the high pressure pump 22 in series relation.

The pump 21 incorporates an impeller connected to a rotatable shaft 27 and has vapor separating characteristics, the impeller being rated to operate at rotational speeds in the order of 4000 to 8000 revolutions per minute.

The pump 22 incorporates a centrifugal high pressure impeller connected to a rotatable shaft 28 and rated for operation at rotational speeds in the order of 20,000 to 40,000 revolutions per minute.

To drive the pumps 21 and 22, there is provided an air driven turbine 29 receiving high pressure air from the engine compressor through the conduit 18. It will be understood by those versed in the art that the turbine wheel of the turbine 29 will be rated for operation at rotational speeds in the order of 20,000 to 40,000 revolutions per minute. Accordingly, a direct mechanical connection 30 is provided between the turbine wheel of the turbine 29 and the impeller of the pump 22.

To interconnect the pumps 21 and 22 so that the turbine 29 will operate as a common driving motor for both of the pumps, a speed-proportioning control means 31 is provided which may conveniently comprise a fluid coupling or torque converter operable as a hydrodynamic speed reducer and functioning to maintain a constant speed ratio between the shafts 27 and 28 and hence of the pumps 21 and 22 irrespective of the loads imposed upon the turbine 29.

Control of the speed ratio in the speed-proportioning control means 31 is effected by controlling the amount of coupling fluid in the working circuit, and, accordingly, there is shown in Figure 2 fluid connection 32 between opposite side of the speed-proportioning control means 31 regulated by a valve 33.

In a fuel pump installation for an aircraft engine, it will be understood that fuel supply requirements vary widely in response to altitude changes and, accordingly, in the aircraft application of a turbine driven two-stage pump a wide range of turbine speeds will be encountered. More specifically, the speed characteristics of the turbine 29 will be directly related to the hydraulic horsepower to be delivered by the pumping units driven by the turbine 29 and will also be related to the air horsepower delivered to the turbine 29 in driving the turbine 29. By the proper provision of the hydrodynamic speed-proportioning control means 31, a constant speed ratio will be maintained between the shafts 27 and 28 irrespective of varying altitudes of the aircraft and the resulting variations in turbine load. Moreover, the combination of the two pumping stages and the turbine wheel drive provide a compact package unit which can be effectively mounted on the inside of a fuel cell in an aircraft fuel system.

Referring now to Figure 3, a structural embodiment of the fuel pump 12 is illustrated in greater detail.

As shown in Figure 3, the bottom wall of the fuel cell 10 is indicated at 11 and provides a mounting surface for the unitary fuel pump casing 36 formed as a plurality of assembled-together casing sections indicated respectively at 36a, 36b, 36c and 36d.

The turbine 29 is housed in the casing section 36a and comprises a turbine wheel or rotor 37 which is secured on the projecting end portion of a shaft 30 by fastening means indicated at 38. The turbine wheel 37 is of integral construction and embodies a hub portion of generally frustoconical configuration, decreasing in diameter in an outward direction, and includes a plurality of circumferentially spaced, radially extending vanes or blades 39.

To supply pressurized fluid to the turbine rotor or wheel 37 so as to effect its rotation, a nozzle ring member 40 is provided which is of generally annular configuration and which has a plurality of circumferentially spaced nozzle apertures 41 arranged to have their discharge openings immediately adjacent the end face of the turbine rotor blades 39. To supply pressured fluid concurrently to all of the nozzle apertures 41, an annular shroud 42 is secured in firm assembly to the nozzle ring 40 and to one end of the casing section 36a, thereby to provide a generally toroidal fluid inlet chamber 43 connected to the conduit 18 by means of a conduit 44 extending through the bottom wall 11 of the fuel cell 10 and connected to the shroud member 42.

The casing section 36a is recessed as at 46, thereby to provide an outlet chamber discharging the spent fluid to the outside of the fuel cell by way of an outlet conduit indicated at 47.

The casing section 36b provides a housing for the pumping unit 22 which is particularly characterized by the utilization of a high speed high pressure centrifugal impeller 48 securely mounted on a projecting portion of the shaft 30 so as to be co-rotatable with the turbine wheel 37.

As appears on Figure 3, the housing section 36b abuttingly engages the adjoining housing section 36c and together the housing sections form a volute pumping chamber 49 for the impeller 48, a reduced neck portion 50 in the housing section 36c providing a center inlet 51 for the impeller 48.

The impeller 48 includes a plurality of circumferentially spaced radially extending passages or vanes 52 which communicate with the center inlet 51 and which discharge peripherally thereof whereupon the fluid leaves the pump through a pump outlet indicated at 53. The discharged fluid is then carried from the outlet 53 through the conduit 13 and to the jet engine 17. An outlet conduit 54 is shown connected to the outlet 53 of the pump 12 for conducting the pressurized fuel to the outside of the fuel cell 10.

It may be further noted that the casing section 36b also provides a bearing housing portion 56 seating spaced bearings indicated generally at 57 for journaling the rotatable shaft 30. To prevent leakage along the shaft 30 suitable shaft seals are provided including a shaft seal 58 adjacent the turbine wheel 37 and a shaft seal 59 adjacent the centrifugal impeller 48.

The casing or housing section 36d provides a housing for the pumping unit 21 which is particularly characterized by the utilization of a low speed vapor separating and low pressure type impeller indicated at 60.

In the embodiment of Figure 3, the impeller 60 takes the form of a helicoidal impeller mounted on a shaft 27 and provided with screw-type vanes prescribing the path of a helix around the shaft 27 so as to advance fluid axially from an inlet 23 provided at one end of the casing section 36d.

The casing section 36d is further provided with a reduced neck forming a throat 61 at the inlet 23 and the vanes of the impeller 60 enjoy a close-running clearance relationship with the walls of the throat 61. The impeller 60 is also provided with a hub 62 and between the hub 62 and the helical blades there is provided a plurality of circumferentially spaced radial vanes 63 so that each vane 63 is at the upper terminus of a helix blade and forms an end wall for the path between two adjacent helix blades.

The casting section 36d also includes a reduced neck providing a passage 64 in which is secured a diffuser ring 66 having an outturned flange 67 overlying the radial blades 63 and having an upstanding cylindrical collar portion which surrounds the hub 62 in spaced concentric relation so as to leave an annular gap 68 of convergent configuration providing a restricted throat or venturi section.

Between the passage 64 and the throat 61, the casing section 36d is shaped to provide a volute pumping chamber 69 communicating with oppositely extending discharge passages 70 leading to the center inlet 51 of the high speed centrifugal impeller 48. With such an arrangement, the two impellers 48 and 60 are interconnected in series relation.

The gap 68 receives vapor-rich fluid from the pumping chamber 69 through the spaces adjacent portions of the impeller 60 so that the impeller 60 acts in the nature of a centrifugal separator whereby light, vapor-rich fractions of the fluid being pumped will tend to collect around the hub 62 of the impeller while the heavier, fully liquid material is centrifugally discharged to the outer periphery of the impeller. This vapor-laden lighter fraction, as it travels upward in the impeller stage around the impeller hub 62 will be discharged out of the pump through the diffuser gap 68 to prevent the pumping unit 21 from becoming vapor bound.

The helicoidal impeller 60 is one form of a low speed, low pressure impeller having improved vapor-separating characteristics and operable at rated rotational speeds of approximately 4000 to 8000 R. P. M. It will be appreciated, however, that other structural embodiments of low speed, low pressure impellers having improved vapor-separating characteristics can also be successfully employed in accordance with the principles of the present invention. Accordingly, there is illustrated in Figures 5 and 6 a modified form of vapor-separating impeller.

In the arrangement of Figures 5 and 6, the casing section 36d is provided with a throat portion 71 forming an inlet 72 establishing communication between the interior of the fuel cell and the inside of the casing 36. The impeller is indicated at 73 and is mounted for rotation on the shaft 27. The impeller 73 may be generally described as having a plurality of circumferentially spaced flat teeth 78 radiating somewhat tangentially from the bottom end of a hub 74 and converging to points lying in a circle which closely overlie the throat portions of the casing section 36d. Each tooth provides a flat web and a blade or vane 76 depends from the leading edge of each tooth. Each blade or vane 76 has relatively depth or elongated broad faced portions overlying a tapered passage 77 provided by the throat portion 71 of the casing section 36d.

When fluid enters the inlet 72, the rotating impeller vanes 76 induce rotation of the fluid and the liquid in the peripheral portion will be sliced off, scooped up and continually pushed upwardly towards the root portions of the vanes 76 towards the teeth 78 of the impeller where the liquid-rich material is pressurized into the volute chamber 69 provided by the casing section 36d.

The vapor-rich fluid which has been scooped up by the vanes of the impeller is freed by means of the diffusion ring 66 providing the annular gap 68 through which the vapors pass.

In the structural embodiment of Figure 3, the speed-proportioning control means 31 comprises a fluid coupling having a casing 79 housing a pump 80 connected for corotation with a projecting end of the shaft 30 and a turbine 81 connected for corotation with a projecting end of the shaft 27. The control of the speed ratio between the pump 80 and the turbine 81 of the fluid coupling is effected by controlling the amount of coupling fluid in the working circuit within the casing 79. By providing a speed reduction at the fluid coupling of approximately 5:1 an effective ratio can be maintained between a typical turbine driven pump speed, for example, 25,000 R. P. M. to a typical booster pump speed, for example, 5000 R. P. M. In practice, good results are obtainable with a rotatable first stage impeller incorporating vapor-separating characteristics and rated for operation at rotational speeds in the order to 4000 to 8000 R. P. M. while the rotatable second stage impeller takes the form of a centrifugal high pressure impeller rated for operation at rotational speeds in the order of 20,000 to 40,000 R. P. M. Since rotatable air-driven turbine wheels will also be rated for operation at rotational speeds in the order of 20,000 to 40,000 R. P. M., a direct mechanical connection can be effected between the turbine wheel and the centrifugal impeller while the speed-proportioning control means 31 operates as a hydrodynamic speed reducer to maintain a constant speed ratio between the high speed and low speed shafts irrespective of turbine loads.

Although various minor modifications might be suggested by those versed in the art, it should be understood that I wish to embody within the scope of the patent warranted hereon all such modifications as reasonably and properly come within the scope of my contribution to the art.

I claim as my invention:

1. A two-stage aircraft fuel pump comprising a single casing means having a pump inlet and a pump outlet, a turbine wheel in said casing means and exhibiting speed characteristics which are the function of delivered hydraulic horsepower and driving fluid horsepower and which vary accordingly in response to changes in altitude of the fuel pump, a first pumping unit at said inlet having rotary, low-speed, vapor-separating fluid impelling means receiving fluid from said inlet, a second pumping unit in said casing means having rotary, high speed centrifugal fluid impelling means receiving fluid from said first pumping unit and discharging to said outlet, a direct mechanical connection between said turbine and said high speed second pumping unit, an hydrodynamic speed proportioning control means in said casing means interconnecting said first and second pumping units to maintain a constant speed ratio between said pumping units irrespective of load on said turbine wheel to obtain optimum altitude performance of said fuel pump.

2. A two-stage aircraft fuel pump having a turbine wheel exhibiting speed characteristics which are the function of delivered hydraulic horsepower and driving fluid horsepower and which vary accordingly in response to changes in altitude of the fuel pump, said pump further comprising a single casing means having a pump inlet and a pump outlet, a low-speed, vapor-separating, low-pressure pumping unit at said inlet, a high-speed, centrifugal, high-pressure pumping unit in series therewith and discharging into said outlet, a direct mechanical connection between said high-speed pumping unit and said turbine wheel, and speed-proportioning control means interconnecting said pumping units to maintain a constant speed ratio between said pumping units irrespective of load on said turbine wheel to obtain optimum altitude performance of said fuel pump, said low-speed pumping unit including a helicoidal impeller providing a plurality of screw vanes defining helix paths therebetween terminating in a plurality of circumferentially spaced radial vanes and further including a concentrically spaced hub and diffusion ring together forming an annular venturi gap through which vapor-rich fluid is passed while liquid-rich fluid is discharged radially outwardly by the radial vanes for further pressurization by the high-speed pumping unit.

3. A two-stage aircraft fuel pump having a turbine wheel exhibiting speed characteristics which are the function of delivered hydraulic horsepower and driving fluid horsepower and which vary accordingly in response to changes in altitude of the fuel pump, said pump further comprising a single casing means having a pump inlet and a pump outlet, a low-speed, vapor-separating, low-pressure pumping unit at said inlet, a high-speed, centrifugal, high-pressure pumping unit in series therewith and discharging into said outlet, a direct mechanical connection between said high-speed pumping unit and said turbine wheel, and speed-proportioning control means interconnecting said pumping units to maintain a constant speed ratio between said pumping units irrespective of load on said turbine wheel to obtain optimum altitude performance of said fuel pump, said low-speed pumping unit including an impeller having a hub and a plurality of circumferentially spaced vanes projecting axially downwardly from one end of the hub and also projecting radially outwardly with respect to the hub, each of the vanes including an inner centrifugal discharge surface, a diffusion ring spaced concentrically of the hub and forming together therewith a vapor passage receiving vapor-rich fluid moved by the impeller, the liquid-rich fluid being discharged radially outwardly for further pressurization by the high-speed pumping unit.

References Cited in the file of this patent

UNITED STATES PATENTS

| | | |
|---|---|---|
| 2,194,054 | Peterson | Mar. 19, 1940 |
| 2,400,307 | Hobbs et al. | May 14, 1946 |
| 2,442,639 | Curtis | June 1, 1948 |
| 2,612,020 | Griffith | Sept. 30, 1952 |